US012777088B2

(12) United States Patent
Kim et al.

(10) Patent No.: US 12,777,088 B2
(45) Date of Patent: Oct. 27, 2026

(54) ELECTRONIC APPARATUS THAT PERFORMS ONBOARDING FOR PLURALITY OF EXTERNAL APPARATUSES AND CONTROL METHOD THEREFOR

(71) Applicant: Samsung Electronics Co., Ltd., Suwon-si (KR)

(72) Inventors: Jinhwan Kim, Suwon-si (KR); Seongil Hahm, Suwon-si (KR); Heechan Kang, Suwon-si (KR); Jonghwan Kim, Suwon-si (KR); Hyunjoong Kim, Suwon-si (KR); Moohyun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 19/081,758

(22) Filed: Mar. 17, 2025

(65) Prior Publication Data

US 2025/0220067 A1 Jul. 3, 2025

Related U.S. Application Data

(63) Continuation of application No. PCT/KR2023/016574, filed on Oct. 24, 2023.

(30) Foreign Application Priority Data

Nov. 30, 2022 (KR) ........................ 10-2022-0164927

(51) Int. Cl.
*G06F 21/30* (2013.01)
*G06F 8/61* (2018.01)
(Continued)

(52) U.S. Cl.
CPC ............ *H04L 67/025* (2013.01); *G16Y 40/10* (2020.01); *G16Y 40/50* (2020.01)

(58) Field of Classification Search
None
See application file for complete search history.

(56) References Cited

U.S. PATENT DOCUMENTS 9,923,893 B2 3/2018 Ameling et al.
10,560,448 B1 2/2020 Witten et al.
(Continued)

FOREIGN PATENT DOCUMENTS

KR 100836818 B1 6/2008
KR 102058048 B1 12/2019
(Continued)

OTHER PUBLICATIONS

"Jordan Krause, Mastering Windows Server 2019: The complete guide for system administrators to install, manage, and deploy new capabilities with Windows Server 2019 , Packt Publishing, 2021." (Year: 2021).*

(Continued)

*Primary Examiner* — Christopher B Robinson
(74) *Attorney, Agent, or Firm* — Nixon & Vanderhye, P.C.

(57) ABSTRACT

An example electronic apparatus may include a display and at least one processor configured to identify whether or not the first external apparatus is in an out-of-box experience (OOBE) state, if the first external apparatus is in the OOBE state and the first external apparatus receives information regarding a second external apparatus, receive information regarding the first and second external apparatuses from the first external apparatus, authenticate whether the electronic apparatus has the authority to control or monitor the first external apparatus, if the authority is authenticated, control to transmit the information regarding the first external apparatus to a first server in order to perform onboarding on the first external apparatus, identify whether or not the second external apparatus is present around the electronic (Continued)

apparatus, and, if the second external apparatus is present, display a UI inquiring whether or not to perform onboarding on the second external apparatus.

15 Claims, 11 Drawing Sheets

(51) Int. Cl.

| | |
|---|---|
| ***G16Y 30/00*** | (2020.01) |
| ***G16Y 40/10*** | (2020.01) |
| ***G16Y 40/50*** | (2020.01) |
| ***H04L 67/025*** | (2022.01) |

(56) References Cited

U.S. PATENT DOCUMENTS

| | | | | |
|---|---|---|---|---|
| 10,598,784 | B2 | 3/2020 | Yang et al. | |
| 10,914,485 | B2 | 2/2021 | Yoon | |
| 10,924,480 | B2 | 2/2021 | Patil et al. | |
| 11,586,342 | B2 | 2/2023 | Kim et al. | |
| 2006/0036354 | A1* | 2/2006 | Maekawa | H04L 63/10 701/1 |
| 2015/0121470 | A1 | 4/2015 | Rongo et al. | |
| 2016/0308861 | A1 | 10/2016 | Ameling et al. | |
| 2017/0346802 | A1* | 11/2017 | Gruskin | G06F 8/62 |
| 2019/0342277 | A1* | 11/2019 | Gruskin | H04L 67/02 |
| 2020/0076896 | A1* | 3/2020 | Anumala | H04W 4/70 |
| 2023/0027580 | A1* | 1/2023 | Zamarato | G06F 21/126 |
| 2023/0353555 | A1 | 11/2023 | Kim et al. | |
| 2023/0389004 | A1* | 11/2023 | Chaudhuri | H04B 7/0452 |
| 2024/0056808 | A1 | 2/2024 | Kim et al. | |

FOREIGN PATENT DOCUMENTS

| | | | |
|---|---|---|---|
| KR | 102218295 | B1 | 2/2021 |
| KR | 20210094860 | A | 7/2021 |
| KR | 20220142774 | A | 10/2022 |
| WO | 2022154272 | A1 | 7/2022 |
| WO | 2022220584 | A1 | 10/2022 |

OTHER PUBLICATIONS

"Codifying a Customer Experience an IP.com Prior Art Database Technical Disclosure Authors et. al.: Disclosed Without Attribution IP.com No. IPCOM000176617D, IP.com Electronic Publication Date: Nov. 19, 2008" (Year: 2008).*

International Search Report for PCT/KR2023/016574 mailed Feb. 16, 2024, 4 pages, with English translation.

Written Opinion of the ISA for PCT/KR2023/016574 mailed Feb. 16, 2024, 4 pages.

* cited by examiner

ELECTRONIC APPARATUS THAT PERFORMS ONBOARDING FOR PLURALITY OF EXTERNAL APPARATUSES AND CONTROL METHOD THEREFOR

CROSS-REFERENCE TO RELATED APPLICATIONS

This application is a continuation of International Application No. PCT/KR2023/016574, designating the United States, filed on Oct. 24, 2023, in the Korean Intellectual Property Receiving Office and claiming priority to Korean Patent Application No. 10-2022-0164927, filed on Nov. 30, 2022 in the Korean Intellectual Property Office, the disclosures of each of which are incorporated by reference herein in their entireties.

BACKGROUND

Field

The disclosure relates to Internet of things (IoT) and relates to an electronic apparatus that performs onboarding on a plurality of external apparatuses in which the IoT is available and a control method therefor.

Description of Related Art

Cloud computing technology is a technology for providing a computing resource existing in a position different from that of a user to the user through a network to provide a computing service such as a server, storage, software, or analysis. Cloud computing can be utilized to process data generated from the IoT. Data or a content of the user collected in an IoT device is stored in a cloud server and a cloud service may be provided to the user through data processing.

To use the IoT device under an IoT environment, an onboarding process is required for registering the IoT device on the cloud server. To perform onboarding on the IoT device, there may be need for authentication information for authenticating the IoT device, Uniform Resource Locator (URL) information required for connecting to the cloud server and/or device information such as a type of device, a profile, or location information of the IoT device.

SUMMARY

According to an example embodiment of the disclosure, an electronic apparatus includes a display, a communication interface (including, e.g., communication interface circuitry), memory, and at least one processor (including, e.g., processing circuitry), wherein the at least one processor is configured to identify whether a first external apparatus is in an Out-Of-Box Experience (OOBE) state based on a signal received from the first external apparatus, based on the first external apparatus being in the OOBE state and information about a second external apparatus connected to the first external apparatus being received by the first external apparatus, receive information about the first and second external apparatuses from the first external apparatus through the communication interface, authenticate whether the electronic apparatus has authority to control or monitor the first external apparatus, based on the authority of the electronic apparatus being authenticated, control the communication interface to transmit the information about the first external apparatus to a first server to perform onboarding on the first external apparatus, identify whether the second external apparatus is present around the electronic apparatus based on a signal received from the second external apparatus, and, based on the second external apparatus being present around the electronic apparatus, display a UI inquiring about whether to perform onboarding on the second external apparatus on the display.

According to an example embodiment, a method of controlling an electronic apparatus includes identifying whether a first external apparatus is in an OOBE state based on a signal received from the first external apparatus, based on the first external apparatus being in the OOBE state and information about a second external apparatus connected to the first external apparatus being received by the first external apparatus, receiving information about the first and second external apparatuses from the first external apparatus through a communication interface, authenticating whether the electronic apparatus has authority to control or monitor the first external apparatus, based on the authority of the electronic apparatus being authenticated, controlling the communication interface to transmit the information about the first external apparatus to a first server to perform onboarding on the first external apparatus, identifying whether the second external apparatus is present around the electronic apparatus based on a signal received from the second external apparatus, and, based on the second external apparatus being present around the electronic apparatus, displaying a UI inquiring about whether to perform onboarding on the second external apparatus on a display.

According to an embodiment of the disclosure, a non-transitory computer readable recording medium may store computer instructions that, when executed by one or more processors of an electronic apparatus including a display, cause the electronic apparatus to identify whether a first external apparatus is in an OOBE state based on a signal received from the first external apparatus, based on the first external apparatus being in the OOBE state and information about a second external apparatus connected to the first external apparatus being received by the first external apparatus, receive information about the first and second external apparatuses from the first external apparatus through a communication interface, authenticate whether the electronic apparatus has authority to control or monitor the first external apparatus, based on the authority of the electronic apparatus being authenticated, control the communication interface to transmit the information about the first external apparatus to a first server to perform onboarding on the first external apparatus, identify whether the second external apparatus is present around the electronic apparatus based on a signal received from the second external apparatus, and, based on the second external apparatus being present around the electronic apparatus, display a UI inquiring about whether to perform onboarding on the second external apparatus on a display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
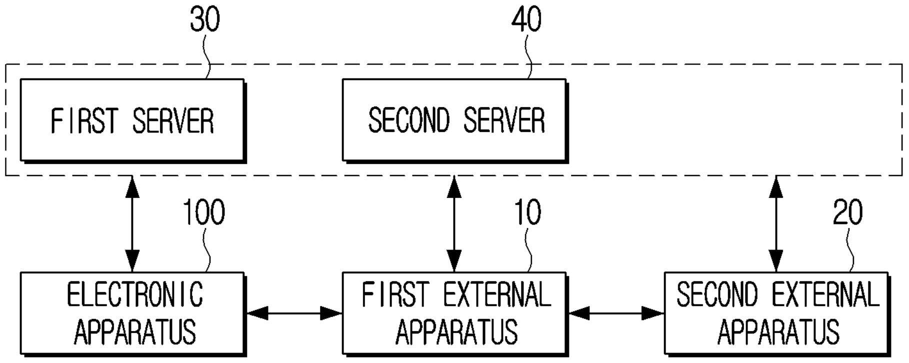
FIG. 1 is a block diagram illustrating example onboarding according to various embodiments.

Example embodiments of the disclosure may be modified in various different forms and may have various embodiments, wherein specific embodiments are shown in the drawings and specifically explained in the detailed description. However, it should be noted that the various embodiments are not for limiting the scope of the disclosure to a specific embodiment but they should be interpreted to include all modifications, equivalents, and/or alternatives of the example embodiments of the disclosure. With respect to the description of the drawings, similar components may be designated by similar reference numerals.

In a case it is determined that in describing the disclosure, the detailed description of related known functions or configurations may unnecessarily confuse the gist of the disclosure, the detailed description thereof will be omitted.

In addition, the example embodiments below may be modified in various different forms, and the scope of the technical idea of the disclosure is not limited to the embodiments below. Rather, these example embodiments are provided to make the disclosure more sufficient and complete, and to fully convey the technical idea of the disclosure to those skilled in the art.

The terms used in the disclosure are used only to explain specific embodiments and are not intended to limit the scope of a right of the disclosure. A singular expression includes a plural expression, unless obviously differently defined in the context.

In the disclosure, the expression such as "have," "may have," "include", or "may include" denotes the existence of such a characteristic (e.g. a numerical value, a function, an operation, or a component such as a part), and the expression does not exclude the existence of an additional characteristic (s).

In the disclosure, the expression "A or B", "at least one of A and/or B", "one or more of A and/or B", or the like may include all possible combinations of the listed items. For example, "A or B", "at least one of A and B", "at least one of A and/or B", or "at least one of A or B" may refer to all of the following cases: (1) including at least one A, (2) including at least one B, or (3) including all of at least one A and at least one B.

The expression "1st", "2nd", "first", "second", or the like used in the disclosure may be used to describe various elements regardless of any order and/or degree of importance, wherein the expression is used only to distinguish one element from another element and is not intended to limit the elements.

Meanwhile, the description that one element (e.g. a first element) is "(operatively or communicatively) coupled with/to" or "connected to" another element (e.g. a second element) should be interpreted such that the one element is directly coupled to the another element or the one element is coupled to the another element through the other element (e.g. a third element).

In contrast, the description that one element (e.g. a first element) is "directly coupled" or "directly connected" to another element (e.g. a second element) may be interpreted to mean that the other element (e.g. a third element) is not present between the one element and the another element.

The expression "configured to" used in the disclosure may be interchangeably used with other expressions, for example, "suitable for", "having the capacity to", "designed to", "adapted to", "made to", or "capable of" depending on circumstances. The term "configured to (or set to)" may not necessarily mean "specifically designed to" in terms of hardware.

Instead, under some circumstances, the expression "a device configured to" may refer, for example, to the device "being capable of" performing an operation together with another device or component. For example, the phrase "a processor configured to (set to) perform A, B, and C" may refer, for example, to a dedicated processor for performing the corresponding operations (e.g. an embedded processor), or a generic-purpose processor that may perform the corresponding operations by executing one or more software programs stored in a memory device (e.g. a CPU or an application processor).

In example embodiments of the disclosure, a 'module' or 'part' may perform at least one function or operation and may be implemented as hardware or software, or as a combination of hardware and software. Also, a plurality of 'modules' or 'parts' may be integrated into at least one module and implemented as at least one processor, excluding a 'module' or 'part' that needs to be implemented as specific hardware.

Meanwhile, various elements and areas in the drawings are illustrated schematically. Accordingly, the technical idea of the disclosure is not limited by the relative sizes or intervals illustrated in the appended drawings.

Hereinafter, with reference to the appended drawings, example embodiments according to the disclosure are specifically described to be easily embodied by those skilled in the art.

Various services may be provided through IoT connecting a home appliance corresponding to an external apparatus to the Internet. To use the IoT, onboarding should be performed on the external apparatus. Here, the onboarding may be a process of storing information about the external apparatus in the electronic apparatus such as a smart phone which may interact with the external apparatus and storing the information in a server. Hereinafter, the onboarding on the external apparatus is described with reference to FIG. 1.

FIG. 1 is a block diagram illustrating an example onboarding according to various embodiments.

With reference to FIG. 1, to perform onboarding on a plurality of external apparatuses including a first external apparatus 10 and a second external apparatus 20, an electronic apparatus 100, a first server 30, and a second server 40 may be used.

The electronic apparatus 100 may perform communication with the first external apparatus 10. Specifically, the electronic apparatus 100 may perform communication with the first external apparatus 10 through Wi-Fi communication or Bluetooth Low Energy (BLE) communication.

Here, the electronic apparatus 100 may identify whether the first external apparatus 10 is in a OOBE state, and if the first external apparatus 10 is in the OOBE state, it may receive information about the first external apparatus and the second external apparatus from the first external apparatus 10 through the Wi-Fi or BLE communication.

Further, the first external apparatus 10 and the second external apparatus 20 may be home appliances in which Device to Device Communication (DTD communication) is available. That is, the DTD communication between the first external apparatus 10 and the second external apparatus 20 may be possible.

Here, the DTD communication may be a communication channel between a plurality of external apparatuses and correspond to Universal Asynchronous Receiver/Transmitter (UART) communication, BT/BLE communication, etc. That is, the first external apparatus 10 may receive information about the second external apparatus through the DTD communication and transmit information about the first and second external apparatuses to the electronic apparatus 100. Here, the information about the first external apparatus may include, for example, a serial number, a Media Access Control (MAC) address, or the like of the first external apparatus. Further, the information about the second external apparatus may include, for example, a serial number, a MAC address, or the like of the second external apparatus.

For example, the first external apparatus 10 and the second external apparatus 20 may be separate indoor units constituting a system air conditioner. The first external apparatus 10 and the second external apparatus 20 may be wiredly connected to make UART communication possible. Therefore, one indoor unit may transmit information about the relevant indoor unit to another indoor unit through UART communication.

Meanwhile, the electronic apparatus 100 may be communicatable with the second external apparatus 20.

Further, the electronic apparatus 100 may transmit or receive information with the first server 30 and the second server 40 through the communication interface. Specifically, the electronic apparatus 100 may transmit information about the first and second external apparatus to the first server 30 to perform onboarding on the first external apparatus 10 and/or the second external apparatus 20 through the communication interface.

Meanwhile, if the onboarding on the second external apparatus 20 is not performed, the electronic apparatus 100 may transmit the information about the second external apparatus to the second server 40.

Here, the first server 30 and the second server 40 may be commonly referred to as a cloud server.

Figure 2:
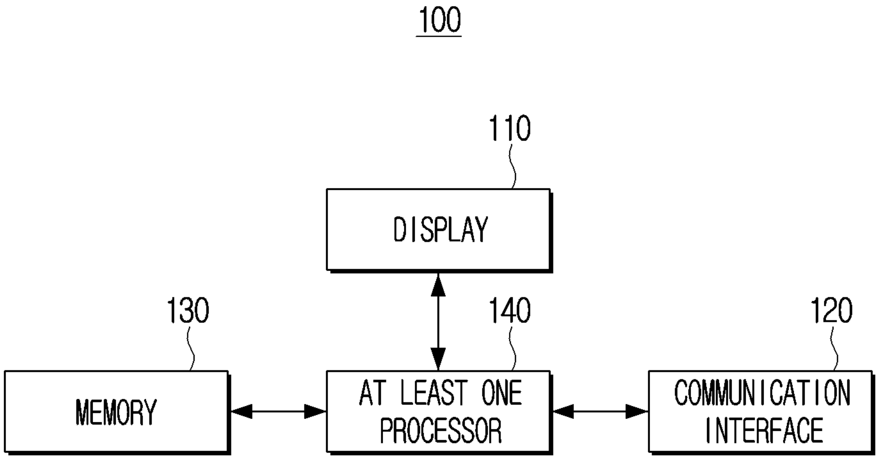
FIG. 2 is a block diagram illustrating a configuration of an example electronic apparatus according to various embodiments.

FIG. 2 is a block diagram illustrating a configuration of an example electronic apparatus according to various embodiments.

With reference to FIG. 2, the electronic apparatus 100 may include a display 110, a communication interface 120, memory 130, and at least one processor 140. However, a configuration of the electronic apparatus 100 shown in FIG. 2 is merely an example, wherein it is apparent that another configuration may be added or a partial configuration may be omitted.

The display 110 may display various information. For the above, the display 110 may include various types of display panels such as a Liquid Crystal Display (LCD) panel, an Organic Light Emitting Diode (OLED) panel, an Active-Matrix Organic Light-Emitting Diode (AM-OLED) panel, a Liquid Crystal on Silicon (LcoS) panel, a Quantum dot Light-Emitting Diode (QLED) panel, and a Digital Light Processing (DLP) panel, a Plasma Display Panel (PDP), an organic LED panel, and a micro LED panel but is not limited thereto. Meanwhile, the display 110 may configure a touch screen together with a touch panel and may be configured of a flexible panel. In particular, the at least one processor 140 (including, e.g., processing circuitry) may display various information related to an operation of the electronic apparatus 100 on the display 110.

According to an embodiment, the communication interface 120 may include a circuit and perform communication with an external apparatus. The communication interface 120 may perform communication with the external apparatus and receive various types of data and information. For example, the communication interface 120 may receive various types of data, information, or the like from a home appliance (e.g. a display device, an air conditioner, an air cleaner, etc.), an external storing medium (e.g. USB memory), an external server (e.g. webhard), or the like through a communication method such as AP-based Wi-Fi (Wi-Fi, Wireless LAN network), Bluetooth, Zigbee, a wired/wireless Local Area Network (LAN), a Wide Area Network (WAN), Ethernet, IEEE 1394, High-Definition Multimedia Interface (HDMI), a Universal Serial Bus (USB), a Mobile High-Definition Link (MHL), Audio Engineering Society/European Broadcasting Union (AES/EBU), an optical method, or a coaxial method. In particular, the electronic apparatus 100 may transmit or receive information about the external apparatus through the communication interface 120 or transmit or receive information to/from a server.

The memory 130 may store necessary data. The memory 130 may be implemented as memory embedded in the electronic apparatus 100 according to a use for data storage or may be implemented as memory detachable from the electronic apparatus 100.

For example, data for driving the electronic apparatus 100 is stored in memory embedded in the electronic apparatus 100 and data for an extension function of the electronic apparatus 100 may be stored in memory detachable from the electronic apparatus 100. Meanwhile, memory embedded in the electronic apparatus 100 may be implemented as at least one of volatile memory (e.g. dynamic RAM (DRAM), static RAM (SRAM), or synchronous dynamic RAM (SDRAM, etc.), non-volatile memory (e.g. one time programmable ROM (OTPROM), programmable ROM (PROM), erasable and programmable ROM (EPROM), electrically erasable and programmable ROM (EEPROM), mask ROM, or flash ROM, flash memory (e.g. NAND flash memory or NOR flash memory, etc.), a hard drive, or a solid state drive (SSD)). Also, memory detachable from the electronic apparatus 100 may be implemented as a memory card (e.g. a compact flash (CF) card, a secure digital (SD) card, a micro secure digital (Micro-SD) card, a mini secure digital (Mini-SD) card, an extreme digital (xD) card, a multi-media card (MMC), etc.), external memory connectable to a USB port (e.g. USB memory), etc. According to an embodiment, the memory 130 may store a computer program including at least one instruction or instructions for controlling the electronic apparatus 100. In particular, the memory 130 may store information about the electronic apparatus and/or information about a plurality of external apparatuses.

At least one processor 140 (including, e.g., processing circuitry) may be implemented as a digital signal processor (DSP) processing a digital signal, a microprocessor, or a time controller (TCON). Meanwhile, the disclosure is not limited thereto and it may include one or more of a central processing unit (CPU), a micro controller unit (MCU), a micro processing unit (MPU), a controller, an application processor (AP), or a communication processor (CP), an ARM processor, or an AI processor or may be defined by the relevant terms. Also, the at least one processor 140 may be implemented as a system on chip (SoC) on which a processing algorithm is embedded or a large scale integration (LSI) and may be implemented as a field programmable gate array (FPGA). The at least one processor 140 may perform various functions by executing computer executable instructions stored in the memory.

At least one processor 140 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The at least one processor 140 may control one or any combination of other components of the electronic apparatus and perform an operation related to communication or data processing. The at least one processor 140 may execute at least one program or instruction stored in the memory. For example, the at least one processor 140 may perform a method according to example embodiments of the disclosure by executing at least one instruction stored in the memory.

If a method according to an embodiment of the disclosure includes a plurality of operations, the plurality of operations may be performed by one processor and may be performed by a plurality of processors. For example, when a first operation, a second operation, and a third operation are performed by a method according to an embodiment, all of the first operation, the second operation, and the third operation may be performed by a first processor and also, the first operation and the second operation may be performed by the first processor (e.g. a general purpose processor) and the third operation may be performed by a second processor (e.g. an Artificial Intelligence (AI)-dedicated processor).

The at least one processor 140 may be implemented as a single core processor including one core and may be implemented as at least one multi core processor including a plurality of cores (e.g. homogeneous multicores or heterogeneous multicores). If the at least one processor 140 is implemented as a multi core processor, each of the plurality of cores included in the multi core processor may include processor internal memory such as cache memory and on-chip memory, wherein a common cache shared by the plurality of cores may be included in the multi core processor. Also, each of the plurality of cores included in the multi core processor (or part of the plurality of cores) may read and perform program instructions for independently implementing a method according to an embodiment of the disclosure and also, may read and perform program instructions for implementing a method according to an embodiment of the disclosure in connection with all (or part) of the plurality of cores.

If a method according to an embodiment of the disclosure includes a plurality of operations, the plurality of operations may be performed by one core among the plurality of cores included in the multi core processor and may be performed by the plurality of cores. For example, when a first operation, a second operation, and a third operation are performed by a method according to an embodiment, all of the first operation, the second operation, and the third operation may be performed by a first core included in the multi core processor and also, the first operation and the second operation may be performed by the first core included in the multi core processor and the third operation may be performed by the second core included in the multi core processor.

Hereinafter, at least one processor 140 may be referred to as a processor 140.

The processor 140 may identify whether the first external apparatus 10 is in an OOBE state based on a signal received from the first external apparatus 10.

Further, the processor 140, if the first external apparatus 10 is in the OOBE state and information about a second external apparatus connected to the first external apparatus 10 is received by the first external apparatus 10, may receive information about the first and second external apparatuses from the first external apparatus 10 through a communication interface 120.

Further, the processor 140 may authenticate whether the electronic apparatus has authority to control or monitor the first external apparatus 10.

Also, the processor 140, if the authority of the electronic apparatus is authenticated, may control the communication interface 120 to transmit information about the first external apparatus to the first server to perform onboarding on the first external apparatus 10.

Further, the processor 140 may identify whether the second external apparatus 20 is present around the electronic apparatus based on a signal received from the second external apparatus 20.

Thereafter, the processor 140, if the second external apparatus 20 is present around the electronic apparatus, may display a UI inquiring about whether onboarding on the second external apparatus 20 is performed on the display 110.

Meanwhile, the processor 140, if an input (e.g., a user input) for performing onboarding on the second external apparatus 20 is received, may control the communication interface 120 to transmit information about the second external apparatus to the first server to perform the onboarding on the second external apparatus 20.

Also, the processor 140, if an input for not performing onboarding on the second external apparatus 20 is received, may control the communication interface 120 to transmit information about the second external apparatus to the second server.

Further, the processor 140, if an input for performing onboarding on the second external apparatus 20 is received, may transmit information about the electronic apparatus to the first external apparatus 10.

Thereafter, the processor 140, if information that the information about the electronic apparatus transmitted to the second external apparatus 20 through the first external apparatus 10 is confirmed in the second external apparatus 20 is received from the second external apparatus 20, may control the communication interface 120 to transmit the information about the second external apparatus to the first server.

Meanwhile, the processor 140, if the first external apparatus 10 is not in the OOBE state, may control the communication interface 120 to transmit a control command for activating the first external apparatus 10 to the first external apparatus.

Further, if a signal indicating that the first external apparatus 10 is activated is received, the processor 140 may not authenticate whether the electronic apparatus has authority to control or monitor the first external apparatus 10.

Meanwhile, the processor 140 may identify whether the second external apparatus 20 is in an OOBE state based on a signal received from the second external apparatus 20.

Further, the processor 140, if the second external apparatus 20 is not in the OOBE state, may control the communication interface 120 to transmit a control command for activating the second external apparatus 20 to the second external apparatus through the first external apparatus 10.

Still further, the processor 140, if a signal indicating that the second external apparatus 20 is activated is received, may identify whether the second external apparatus 20 is present around the electronic apparatus.

Meanwhile, the information related to the first external apparatus 10 may include, for example, a serial number and a MAC address of the first external apparatus 10 and the information related to the second external apparatus 20 may include, for example, a serial number and a MAC address of the second external apparatus 20.

Meanwhile, the processor 140, if information about a third external apparatus is further received from the first external apparatus through the communication interface, may display a UI inquiring about whether to perform onboarding on the second and third external apparatuses at the same time on the display 110. Hereinafter, with reference to FIGS. 3 and 5, onboarding on a plurality of external apparatuses will be described.

Figure 3:
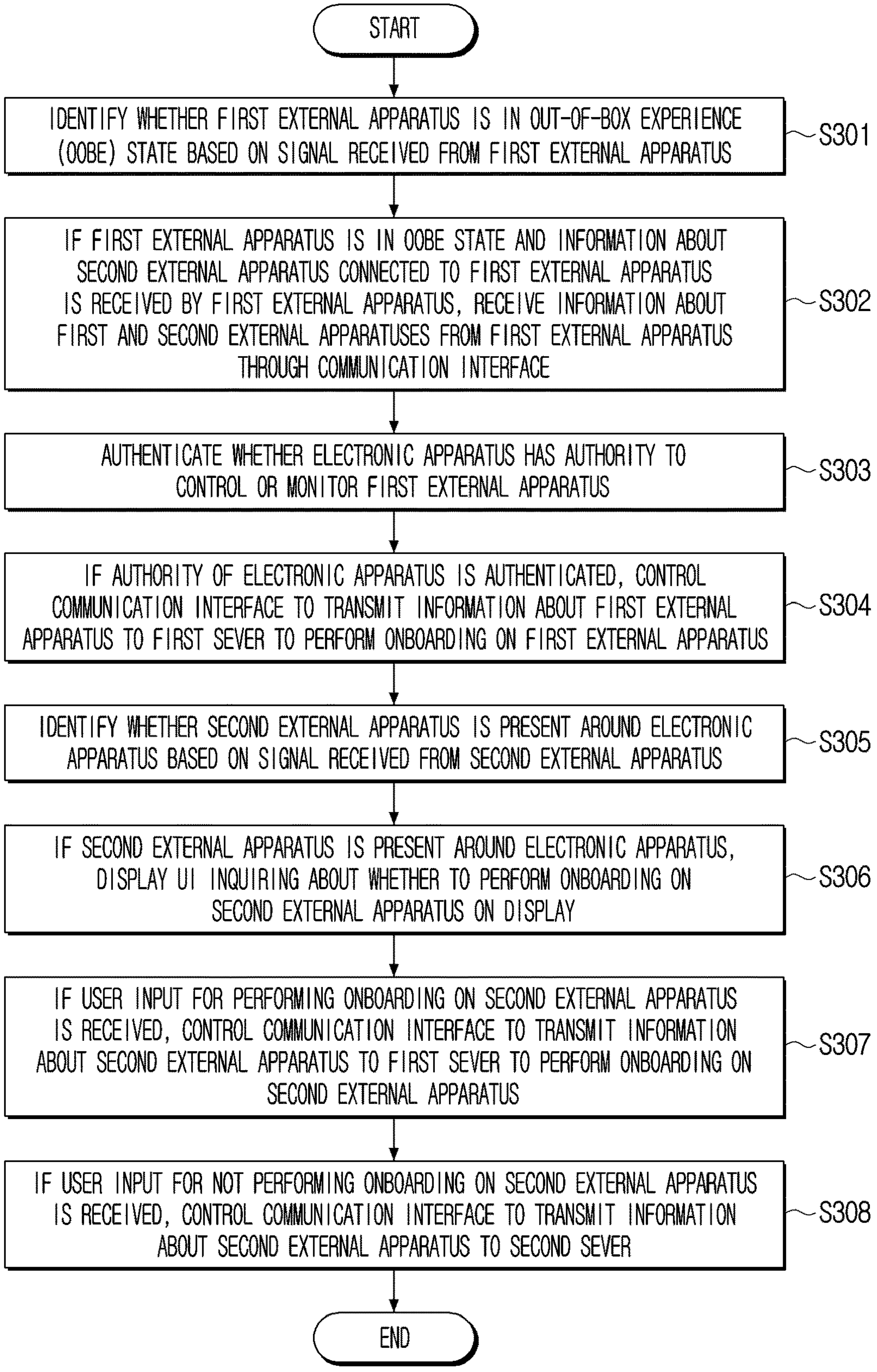
FIG. 3 is a block diagram illustrating an example process in which an example electronic apparatus performs onboarding on a plurality of external apparatuses according to various embodiments.

FIG. 3 is a block diagram illustrating an example process in which an example electronic apparatus performs onboarding on a plurality of external apparatuses according to various embodiments.

With reference to FIG. 3, the processor 140 may identify whether the first external apparatus 10 is in an OOBE state based on a signal received from the first external apparatus 10 (S301). Here, the first external apparatus 10 may be a communicatable device. Further, the OOBE state may, for example, be a state that electric power is initially connected to the external apparatus. If the first external apparatus 10 connected to the electric power is in the OOBE state, the first external apparatus 10 may be in a state that communication connection with the electronic apparatus 100 is possible. For example, if the first external apparatus 10 is in the OOBE state, the first external apparatus 10 may be in a Wi-Fi Beaconing or BLE advertising state and, thus, may be in the state that communication connection with the electronic apparatus 100 is possible.

Further, the processor 140, if the first external apparatus 10 is in the OOBE state and information about a second external apparatus connected to the first external apparatus 10 is received by the first external apparatus 10, may receive information about the first and second external apparatuses from the first external apparatus 10 through the communication interface 120 (S302). Here, the second external apparatus 20 may be a communicatable device. Further, the information about the first and second external apparatuses may, for example, include serial numbers and/and MAC addresses of the first and second external apparatuses. If it is identified that the first external apparatus 10 is in the OOBE state, the processor 140 may receive information about the first and second external apparatuses from the first external apparatus 10. Therefore, the information about the second external apparatus is received by the first external apparatus 10 and then, the processor 140 may receive information about the first and second external apparatuses from the first external apparatus 10. Here, the first external apparatus 10 may receive information about the second external apparatus through DTD communication with the second external apparatus 20.

Here, the reason for receiving not only the information about the first external apparatus but also the information about the second external apparatus is to omit an authentication process to be described in S303.

Further, the processor 140 may authenticate whether the electronic apparatus 100 has authority to control or monitor the first external apparatus 10 (S303). Authority to control or monitor the first external apparatus 10 of the electronic apparatus 100 may be authenticated in various methods. For example, the electronic apparatus 100 may be authenticated about whether to have authority to control or monitor the first external apparatus 10 through a button method, a PIN method, an ultrasonic wave, or the like. This authentication method may, for example, be commonly referred to as a device authentication method. The authentication as above may be a procedure for confirming ownership to the first external apparatus 10.

Meanwhile, the processor 140, if the first external apparatus 10 is not in the OOBE state, may control the communication interface 120 to transmit a control command for activating the first external apparatus 10 to the first external apparatus 10. Here, a state that the first external apparatus 10 is not in the OOBE state may, for example, be a state that the first external apparatus 10 is connected to electric power but is not communicatable with another device or a state that the first external apparatus 10 is in a sleep mode and thus its communication is disconnected. Therefore, to perform communication with the first external apparatus 10, the processor 140 may transmit a control command for activating the first external apparatus 10 to the first external apparatus 10.

As above, if the first external apparatus 10 is activated, the first external apparatus 10 may be in a state that communication connection with the electronic apparatus 100 is possible. For example, the first external apparatus 10 may be in a Wi-Fi Beaconing or BLE advertising state and thus, may be in a state that communication connection with the electronic apparatus 100 is possible.

Further, if a signal indicating that the first external apparatus 10 is activated is received, the processor 140 may not authenticate whether the electronic apparatus 100 has authority to control or monitor the first external apparatus 10. That is, if the first external apparatus 10 is activated by the processor 140, it is considered such that authority to the first external apparatus 10 exists and thus, authority authentication of the electronic apparatus 100 may be omitted.

Thereafter, if the authority of the electronic apparatus is authenticated, the processor 140 may control the communication interface 120 to transmit information about the first external apparatus to the first server 30 to perform onboarding on the first external apparatus 10 (S304). Here, the first server 30 may be a server which stores information about the external apparatus performing communication with the electronic apparatus 100 and performs communication with the external apparatus. That is, the first server 30 may store information about the external apparatus on which onboarding is performed.

Specifically, to perform onboarding on the first external apparatus 10, the processor 140 may control the communication interface 120 to transmit, for example, a serial number and a MAC address of the first external apparatus to the first server.

Meanwhile, if the first external apparatus 10 is activated by a control command of the processor 140, the processor 140 may omit authority authentication of the electronic apparatus and control the communication interface 120 to transmit information about the first external apparatus to the first server 30 to perform onboarding on the first external apparatus.

Meanwhile, the processor 140, when transmitting information about the first external apparatus to the first server 30, may further transmit information about the electronic apparatus. Here, the information about the electronic apparatus may include, for example, a MAC address of the electronic apparatus 100, information about access authority of the electronic apparatus, etc. Here, the information about access authority of the electronic apparatus may include, for example, ID, a password, or the like for access to the electronic apparatus 100.

Meanwhile, if the processor 140 transmits a serial number and/or a MAC address of the first external apparatus to the first server 30 and performs onboarding on the first external apparatus 10, the first external apparatus 10 may transmit information related to a state of the first external apparatus to the first server 30.

As above, in a case that the information transmitted to the first server 30 is transmitted to the electronic apparatus 100, the electronic apparatus 100 may monitor information related to the state of the first external apparatus. For example, if the first external apparatus 10 is a system air conditioner, the electronic apparatus 100 may monitor information about a setting temperature, an indoor temperature, an operation mode, or the like of the system air conditioner through the first server 30.

Further, if onboarding on the first external apparatus 10 is performed, the processor 140 may transmit a control command related to the first external apparatus 10 to the first external apparatus 10 through the first server 30. For example, if the first external apparatus 10 is a system air conditioner, the processor 140 may transmit a control command about on/off of the system air conditioner on which onboarding is performed through the first server 30 to the system air conditioner. Also, the processor 140 may transmit a control command about a setting temperature, an operation mode, or the like to the system air conditioner through the first server 30.

Further, the processor 140 may identify whether the second external apparatus 20 is present around the electronic apparatus 100 based on a signal received from the second external apparatus 20 (S305). Here, the first external apparatus 20 may be in a Wi-Fi Beaconing or BLE advertising state and thus, may be in a state that communication connection with the electronic apparatus 100 is possible. If a signal by which it may be determined that the second external apparatus 20 is in a communicatable state is received, the processor 140 may identify that the second external apparatus 20 is present around.

Meanwhile, the processor 140 may identify whether the second external apparatus 20 is in an OOBE state based on a signal received from the second external apparatus 20. Specifically, the processor 140 may identify whether the second external apparatus 20 is in a Wi-Fi Beaconing or BLE Advertising state in which communication with the electronic apparatus 100 is possible.

Further, the processor 140, if the second external apparatus 20 is not in the OOBE state, may control the communication interface 120 to transmit a control command for activating the second external apparatus 20 to the second external apparatus through the first external apparatus 10. Specifically, if it is identified that the second external apparatus 20 is not in the Wi-Fi Beaconing or BLE Advertising state in which communication with the electronic apparatus 100 is possible, the processor 140 may transmit a control command for activating the second external apparatus 20 to be in the Wi-Fi Beaconing or BLE Advertising state in which communication with the electronic apparatus 100 is possible to the second external apparatus 20 through the first external apparatus 10.

Further, the processor 140, if a signal indicating that the second external apparatus 20 is activated is received, may identify whether the second external apparatus 20 is present around the electronic apparatus 100. Specifically, if a signal indicating that the second external apparatus 20 is in the Wi-Fi Beaconing or BLE Advertising state in which communication with the electronic apparatus 100 is possible in accordance with the control command for activating the second external apparatus being received, the processor 140 may identify that the second external apparatus 20 is present around the electronic apparatus 100.

Hereinafter, with reference to FIGS. 4 and 5, it is described that an example UI inquiring about whether onboarding on the second external apparatus 20 is performed is displayed on a display.

Figure 4:
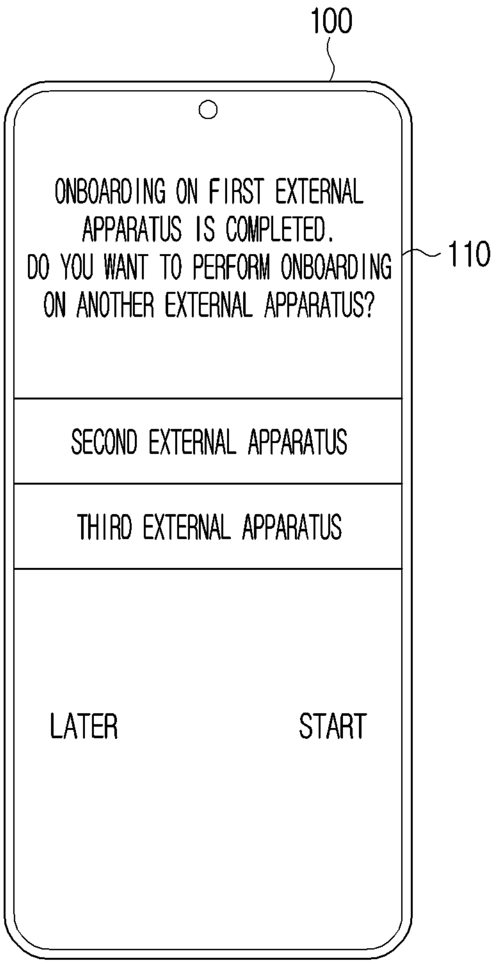
FIG. 4 is a view illustrating an example UI inquiring about whether an example electronic apparatus performs onboarding on a second external apparatus according to various embodiments.

FIG. 4 is a view illustrating an example UI inquiring about whether an electronic apparatus performs onboarding on a second external apparatus according to various embodiments.

With reference to FIG. 4, the processor 140, if the second external apparatus 20 is present around the electronic apparatus 100, may display a UI inquiring about whether onboarding on the second external apparatus 20 is performed on a display 110 (S306). For example, on an upper portion of the UI displayed on the display 110, messages indicating that onboarding of the first external apparatus 10 is completed and inquiring about whether to perform onboarding on an external apparatus identified as being present around may be displayed. Further, on an intermediate portion of the UI displayed on the display 110, the second external apparatus and the third external apparatus on which onboarding may be performed are displayed (identified) and thus, an external apparatus on which onboarding is to be performed may be selected. Still further, on a lower portion of the UI displayed on the display 110, items for selecting whether onboarding on the external apparatus is performed later or onboarding is to be performed now on the selected external apparatus may be displayed.

Here, the processor 140, if a user input for performing onboarding on the second external apparatus 20 is received, may control the communication interface 120 to transmit information about the second external apparatus to the first server to perform the onboarding on the second external apparatus 20 (S307).

Meanwhile, the information about the second external apparatus is received together when the information about the first external apparatus is received, the information about the second external apparatus is received by DTD communication of the first external apparatus 10 and the second external apparatus 20, wherein authority to the first external apparatus 10 is authenticated and thus, the electronic apparatus 100 may omit authority authentication to the second external apparatus.

To perform onboarding on the second external apparatus 20, the processor 140 may control the communication interface 120 to transmit, for example, a serial number and/or a MAC address of the second external apparatus 20 to the first server 30.

Further, if the processor 140 transmits the serial number and/or the MAC address of the second external apparatus 20 to the first server 30 and performs onboarding on the second external apparatus 20, the second external apparatus 20 may transmit information related to a state of the second external apparatus to the first server 30. As above, in a case that the information transmitted to the first server 30 is transmitted to the electronic apparatus 100, the electronic apparatus 100 may monitor information related to the state of the second external apparatus. For example, if the second external apparatus 20 is a system air conditioner, the electronic apparatus 100 may monitor information about a setting temperature, an indoor temperature, an operation mode, or the like of the system air conditioner through the first server 30.

Further, if onboarding on the second external apparatus 20 is performed, the processor 140 may transmit a control command related to the second external apparatus 20 to the second external apparatus 20 through the first server 30. For example, if the second external apparatus 20 is a system air conditioner, the processor 140 may transmit a control command about on/off of the system air conditioner on which onboarding is performed through the first server 30 to the system air conditioner. Also, the processor 140 may transmit a control command about a setting temperature, an operation mode, or the like to the system air conditioner through the first server 30.

Meanwhile, if a user input for performing onboarding on the second external apparatus 20 is received, the processor 140 may transmit information about the electronic apparatus to the first external apparatus 10. Here, the information about the electronic apparatus may include, for example, a MAC address of the electronic apparatus 100, information about access authority of the electronic apparatus, etc.

Thereafter, the processor 140, if an information that the information about the electronic apparatus transmitted to the second external apparatus 20 through the first external apparatus 10 is confirmed in the second external apparatus 20 is received from the second external apparatus 20, may control the communication interface 120 to transmit the information about the second external apparatus to the first server. As above, if the information about the electronic apparatus is confirmed in the second external apparatus 20 through the first external apparatus 10 on which onboarding is performed, the electronic apparatus 100 may omit authority authentication to the second external apparatus 20 because authority to the first external apparatus 10 is authenticated.

Also, if the information about the electronic apparatus is confirmed in the second external apparatus 20, it may be prevented that onboarding is performed by a device other than the electronic apparatus 100 and thus, security may be improved.

Meanwhile, the processor 140, if a user input for not performing onboarding on the second external apparatus 20 is received, may control the communication interface 120 to transmit information about the second external apparatus to the second server 40 (S308). Here, the second server 40 may store information about the external apparatus on which onboarding is not performed among information about the external apparatuses received from the second server 40. That is, in the step S308, the information about the second external apparatus on which onboarding is not performed among the information about the first and second external apparatuses received through the first external apparatus 10 may be transmitted to the second server 40 and be stored in the second server 40.

Thereafter, if a user input for performing onboarding on the second external apparatus 20 is received, the processor 140 may receive the information about the second external apparatus stored in the second server 40 and transmit the information about the second external apparatus to the first server 30 to perform onboarding on the second external apparatus 20.

Otherwise, the processor 140 may receive information about the second external apparatus stored in the second server 40 and display a UI related to a recommendation list about the external apparatus on which onboarding is to be performed on the display 110. Hereinafter, with reference to FIG. 5, is described the UI related to a recommendation list by which onboarding is performed.

Figure 5:
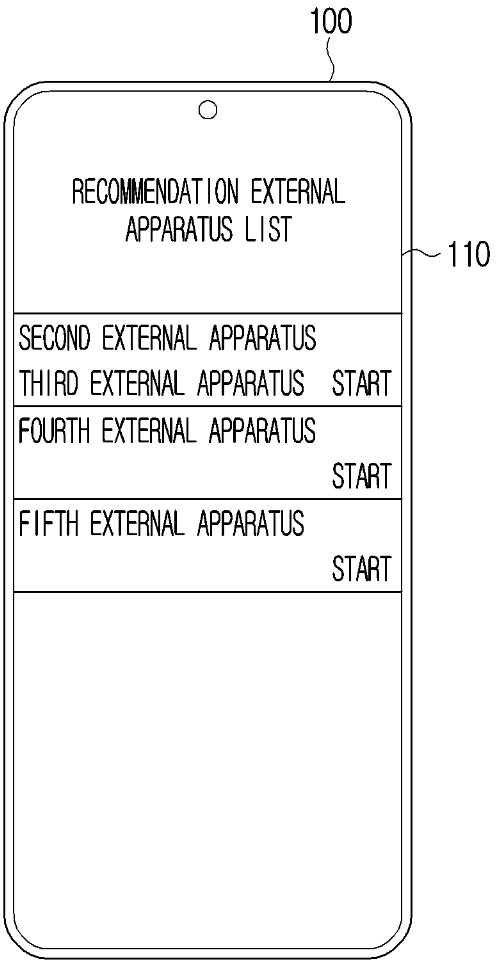
FIG. 5 is a view illustrating an example UI related to a recommendation list by which an example electronic apparatus performs onboarding according to various embodiments.

FIG. 5 is a view illustrating an example UI related to a recommendation list by which an example electronic apparatus performs onboarding according to various embodiments.

With reference to FIG. 5, the processor 140 may perform onboarding on the second external apparatus, third apparatus, fourth apparatus, and fifth external apparatus and display a UI inquiring about whether to perform onboarding on the second external apparatus to the fifth external apparatus based on the recommendation external apparatus list on the display 110.

Here, the processor 140 may display the UI inquiring about whether to perform onboarding on a plurality of external apparatuses at the same time on the display 100. Specifically, the processor 140, if information about a third external apparatus is received from the first external apparatus 10 through the communication interface, may display a UI inquiring about whether to perform onboarding on the second and third external apparatuses at the same time on the display 110. Therefore, if information about a fourth external apparatus is received from the first external apparatus 10, it may display a UI inquiring about whether to perform onboarding on the second to fourth external apparatuses at the same time on the display 110.

If the information about the third external apparatus is received from the first external apparatus 10, and information about the fourth external apparatus and information about the fifth external apparatus are not received through the first external apparatus 10, onboarding on the fourth external apparatus and the fifth external apparatus may be performed individually.

Figure 6:
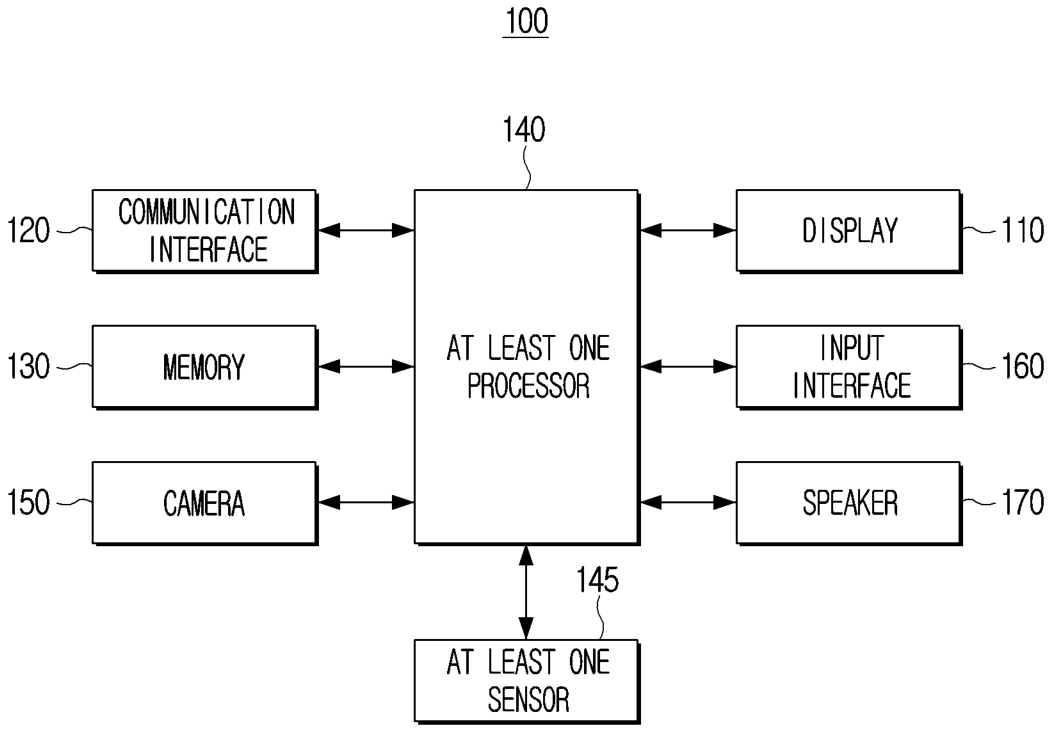
FIG. 6 is a block diagram illustrating a detailed configuration of an example electronic apparatus according to various embodiments.

With reference to FIG. 6, the example electronic apparatus 100 may include a display 110, communication interface 120, memory 130, at least one processor 140, at least one sensor 145, a camera 150, an input interface 160, and a speaker 170. Hereinafter, the detailed description about part overlapped with the description of FIG. 2 will not be repeated.

The camera 150 may photograph a static image or a moving image. According to an embodiment, the camera 150 may include one or more lenses, an image sensor, an image signal processor, or a flash. Here, the camera 150 may photograph a static image or a moving image to obtain the image.

The input interface 160 may include a circuit and receive a user command for setting or selecting various functions supported by the electronic apparatus 100. For the above, the input interface 160 may include a plurality of buttons and be implemented as a touch screen capable of performing a function of a display at the same time.

In this case, the processor 140 may control an operation of the electronic apparatus 100 based on a user command(s) inputted through the input interface 160. For example, the processor 140 may control the electronic apparatus 100 based on an on/off command of the electronic apparatus 100, an on/off command of a function of the electronic apparatus 100, or the like inputted through the input interface 160.

The speaker 170 may output audio sound. Specifically, the processor 140 may output various alarm sound or a voice guidance message related to an operation of the electronic apparatus 100 through the speaker 170.

In particular, the processor 140 may output alarm sound indicating that onboarding of the external apparatus is completed through the speaker 170.

Figure 7:
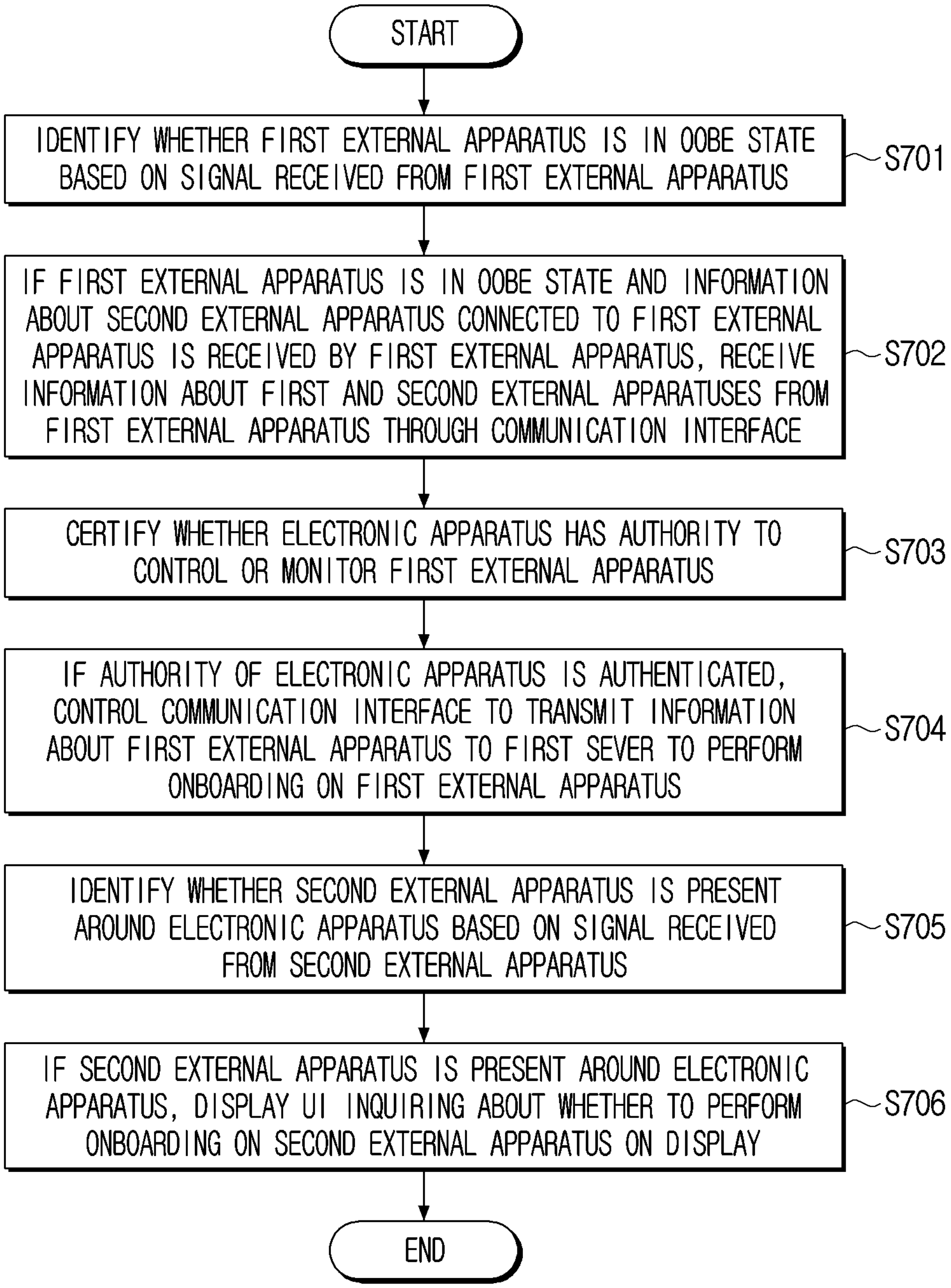
FIG. 7 is a block diagram illustrating an example method of controlling an example electronic apparatus according to various embodiments.

FIG. 7 is a block diagram illustrating an example method of controlling an example electronic apparatus according to various embodiments.

With reference to FIG. 7, the method may include identifying whether the first external apparatus is in an OOBE state based on a signal received from the first external apparatus (S701).

Further, the method may include, if the first external apparatus is in the OOBE state and information about a second external apparatus connected to the first external apparatus is received by the first external apparatus, receiving information about the first and second external apparatuses from the first external apparatus through a communication interface (S702).

Still further, the method may include authenticating whether the electronic apparatus has authority to control or monitor the first external apparatus (S703).

Thereafter, the method may include, if the authority of the electronic apparatus is authenticated, controlling the communication interface to transmit the information about the first external apparatus to a first server to perform onboarding on the first external apparatus (S704).

Further, the method may include identifying whether the second external apparatus is present around the electronic apparatus based on a signal received from the second external apparatus (S705).

Still further, the method may include, if the second external apparatus is present around the electronic apparatus, displaying a UI inquiring about whether to perform onboarding on the second external apparatus on the display (S706).

Meanwhile, the method may include, if a user input for performing onboarding on the second external apparatus is received, controlling the communication interface to transmit the information about the second external apparatus to the first server to perform the onboarding on the second external apparatus.

Meanwhile, the method may include, if the user input for performing the onboarding on the second external apparatus is not received, controlling the communication interface to transmit the information about the second external apparatus to the second server.

Further, the controlling the communication interface to transmit the information about the second external apparatus to the first server may include, if the user input for performing onboarding on the second external apparatus is received, transmitting the information about the electronic apparatus to the first external apparatus.

Still further, the method may include, if information that the information about the electronic apparatus transmitted to the second external apparatus through the first external apparatus is confirmed in the second external apparatus is received from the second external apparatus, controlling the communication interface to transmit the information about the second external apparatus to the first server.

Meanwhile, in the step S702, the method may include, if the first external apparatus is not in the OOBE state, controlling the communication interface to transmit a control command for activating the first external apparatus to the first external apparatus.

Further, the method may include, if a signal indicating that the first external apparatus is activated is received, not authenticating whether the electronic apparatus has authority to control or monitor the first external apparatus.

Meanwhile, in the step S705, the method may include identifying whether the second external apparatus is in the OOBE state based on a signal received from the second external apparatus.

Further, the method may include, if the second external apparatus is not in the OOBE state, controlling the communication interface to transmit a control command for activating the second external apparatus to the second external apparatus through the first external apparatus.

Still further, the method may include, if a signal indicating that the second external apparatus is activated is received, identifying whether the second external apparatus is present around the electronic apparatus.

Meanwhile, the information related to the first external apparatus may include, for example, a serial number and a MAC address of the first external apparatus, and the information related to the second external apparatus may include, for example, a serial number and a MAC address of the second external apparatus.

Meanwhile, the method may include, if information about a third external apparatus is further received from the first external apparatus through communication interface, displaying a UI inquiring about whether to perform onboarding on the second and third external apparatuses at the same time on the display.

FIGS. 8, 9, 10, and 11 are sequence diagrams illustrating an example process in which an example electronic apparatus performs onboarding on a plurality of external apparatuses according to various embodiments.

Figure 8:
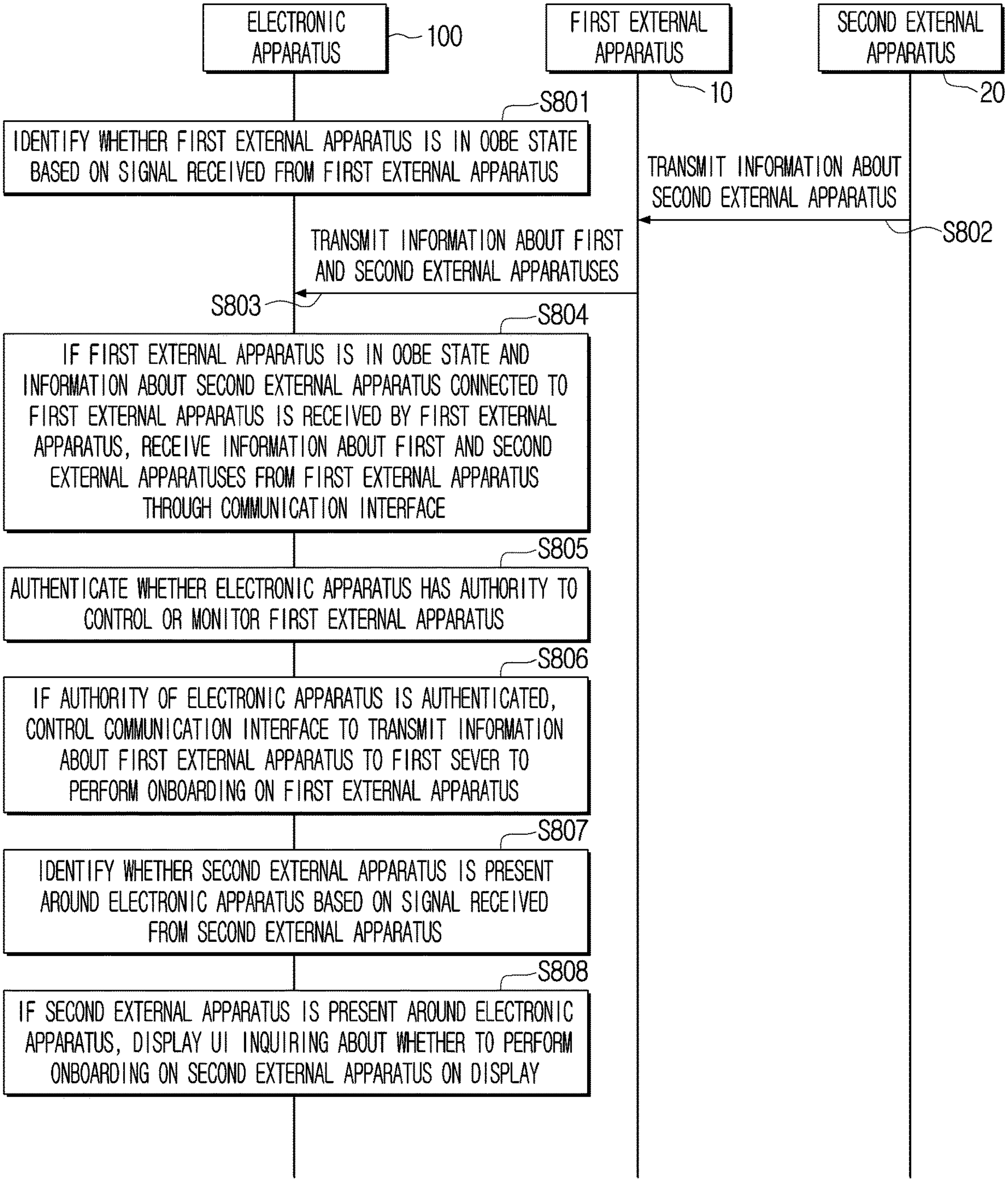
FIGS. 8, 9, 10, and 11 are sequence diagrams illustrating an example process in which an example electronic apparatus performs onboarding on a plurality of external apparatuses according to various embodiments.

With reference to FIG. 8, the electronic apparatus 100 may identify whether the first external apparatus 10 is in an OOBE state based on a signal received from the first external apparatus 10.

Further, the second external apparatus 20 may transmit information about the second external apparatus to the first external apparatus 10 (S802).

Then, the first external apparatus 10 may transmit information about the first and second external apparatuses to the electronic apparatus 100 (S803).

Further, the electronic apparatus 100, if the first external apparatus 10 is in the OOBE state and information about a second external apparatus connected to the first external apparatus 10 is received by the first external apparatus 10, may receive information about the first and second external apparatuses from the first external apparatus 10 through a communication interface (S804).

Further, the electronic apparatus 100 may authenticate whether the electronic apparatus 100 has authority to control or monitor the first external apparatus 10 (S805).

Then, the electronic apparatus 100, if the authority of the electronic apparatus 100 is authenticated, may control the communication to transmit information about the first external apparatus to the first server to perform onboarding on the first external apparatus 10 (S806).

Further, the electronic apparatus 100 may identify whether the second external apparatus 20 is present around the electronic apparatus 100 based on a signal received from the second external apparatus 20 (S807).

Figure 9:
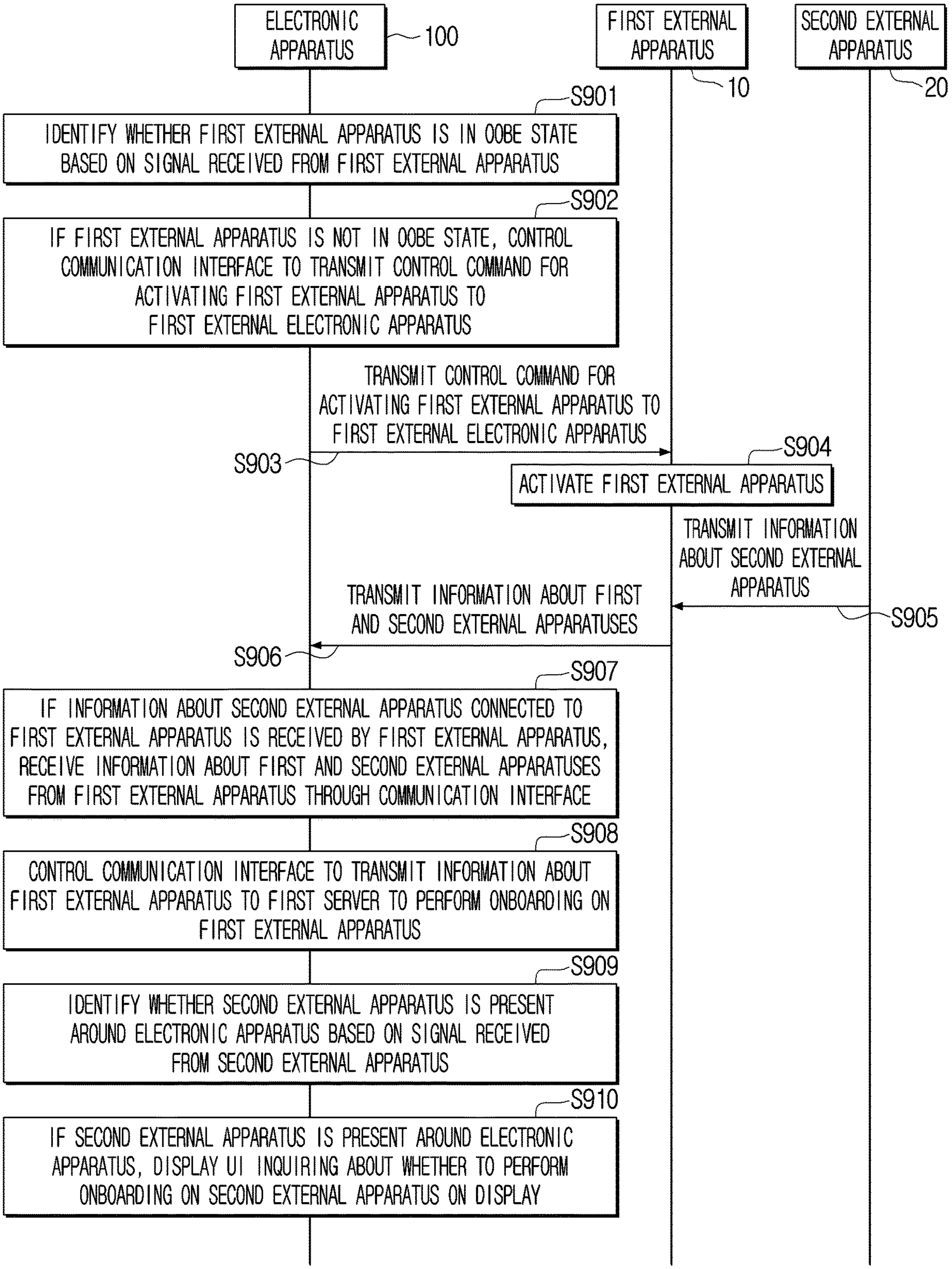

Still further, the method may include, if the second external apparatus 20 is present around the electronic apparatus 100, displaying a UI inquiring about whether onboarding on the second external apparatus 20 is performed on a display (S808). With reference to FIG. 9, the electronic apparatus 100 may identify whether the first external apparatus 10 is in an OOBE state based on a signal received from the first external apparatus 10 (S901).

Further, the electronic apparatus 100, if the first external apparatus 10 is not in the OOBE state, may control the communication interface to transmit a control command for activating the first external apparatus 10 to a first external electronic apparatus 100 (S902).

Still further, the electronic apparatus 100 may transmit a control command for activating the first external apparatus 10 to the first external electronic apparatus 100 (S903).

If the control command for activating the first external apparatus 10 is received by the first external apparatus 10, the first external apparatus 10 may activate the first external apparatus 10 (S904).

Thereafter, the second external apparatus 20 may transmit information about the second external apparatus to the first external apparatus 10 (S905).

Then, the first external apparatus 10 may transmit information about the first and second external apparatuses to the electronic apparatus 100 (S906).

Further, the electronic apparatus 100, if the first external apparatus 10 receives information about the second external apparatus connected to the first external apparatus 10, may receive information about the first and second external apparatuses from the first external apparatus 10 through a communication interface (S907).

Thereafter, the electronic apparatus 100 may control the communication interface to transmit information about the first external apparatus to the first server to perform onboarding on the first external apparatus 10 (S908).

Further, the electronic apparatus 100 may identify whether the second external apparatus 20 is present around the electronic apparatus 100 based on a signal received from the second external apparatus 20 (S909).

Still further, the electronic apparatus 100, if the second external apparatus 20 is present around the electronic apparatus 100, may display a UI inquiring about whether onboarding on the second external apparatus 20 is performed on a display (S910).

Figure 10:
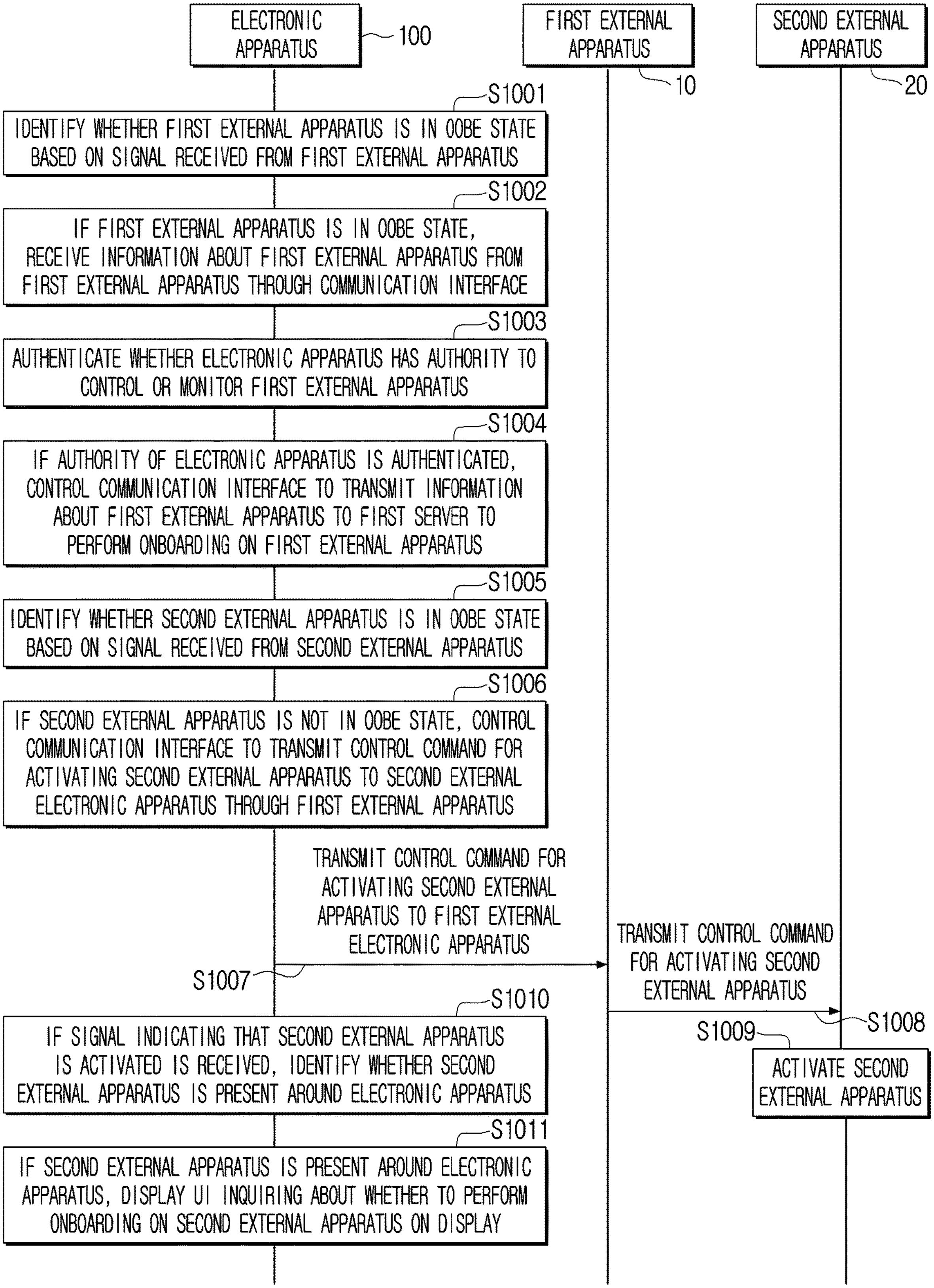

With reference to FIG. 10, the electronic apparatus 100 may identify whether the first external apparatus 10 is in an OOBE state based on a signal received from the first external apparatus 10 (S1001).

Further, the electronic apparatus 100, if the first external apparatus 10 is in the OOBE state, may receive information about the first external apparatus from the first external apparatus 10 through the communication interface (S1002).

Further, the electronic apparatus 100 may authenticate whether the electronic apparatus 100 has authority to control or monitor the first external apparatus 10 (S1003).

Still further, the electronic apparatus 100, if the authority of the electronic apparatus 100 is authenticated, may control the communication interface to transmit information about the first external apparatus to the first server to perform onboarding on the first external apparatus 10 (S1004).

Thereafter, the electronic apparatus 100 may identify whether the second external apparatus 20 is in an OOBE state based on a signal received from the second external apparatus 20 (S1005).

Further, the electronic apparatus 100, if the second external apparatus 20 is not in the OOBE state, may control the communication interface to transmit a control command for activating the second external apparatus 20 to the second external electronic apparatus 20 through the first external apparatus 10 (S1006).

Here, the electronic apparatus 100 may transmit a control command for activating the second external apparatus 20 to the first external electronic apparatus 10 (S1007).

Further, if the first external apparatus 10 receives a control command for activating the second external apparatus 20 from the electronic device 100, a control command for activating the second external apparatus 20 may be transmitted to the second external apparatus 20 (S1008).

Still further, if the second external apparatus 20 receives the control command for activating the second external apparatus 20 from the first external apparatus 10, the second external apparatus 20 may be activated (S1009).

Thereafter, the electronic apparatus 100, if a signal indicating that the second external apparatus 20 is activated is received, may identify whether the second external apparatus 20 is present around the electronic apparatus 100 (S1010).

Still further, the electronic apparatus 100, if the second external apparatus 20 is present around the electronic apparatus 100, may display a UI inquiring about whether onboarding on the second external apparatus 20 is performed on a display (S1011).

Hereinafter, with reference to FIG. 11, it is described that in the onboarding process described in FIG. 10, the information about the electronic apparatus may be further confirmed in the second external apparatus 20. Also, the steps S1001 to S1011 described in FIG. 10 are overlapped and thus, the description is made by not repeating the description of the relevant steps.

Figure 11:
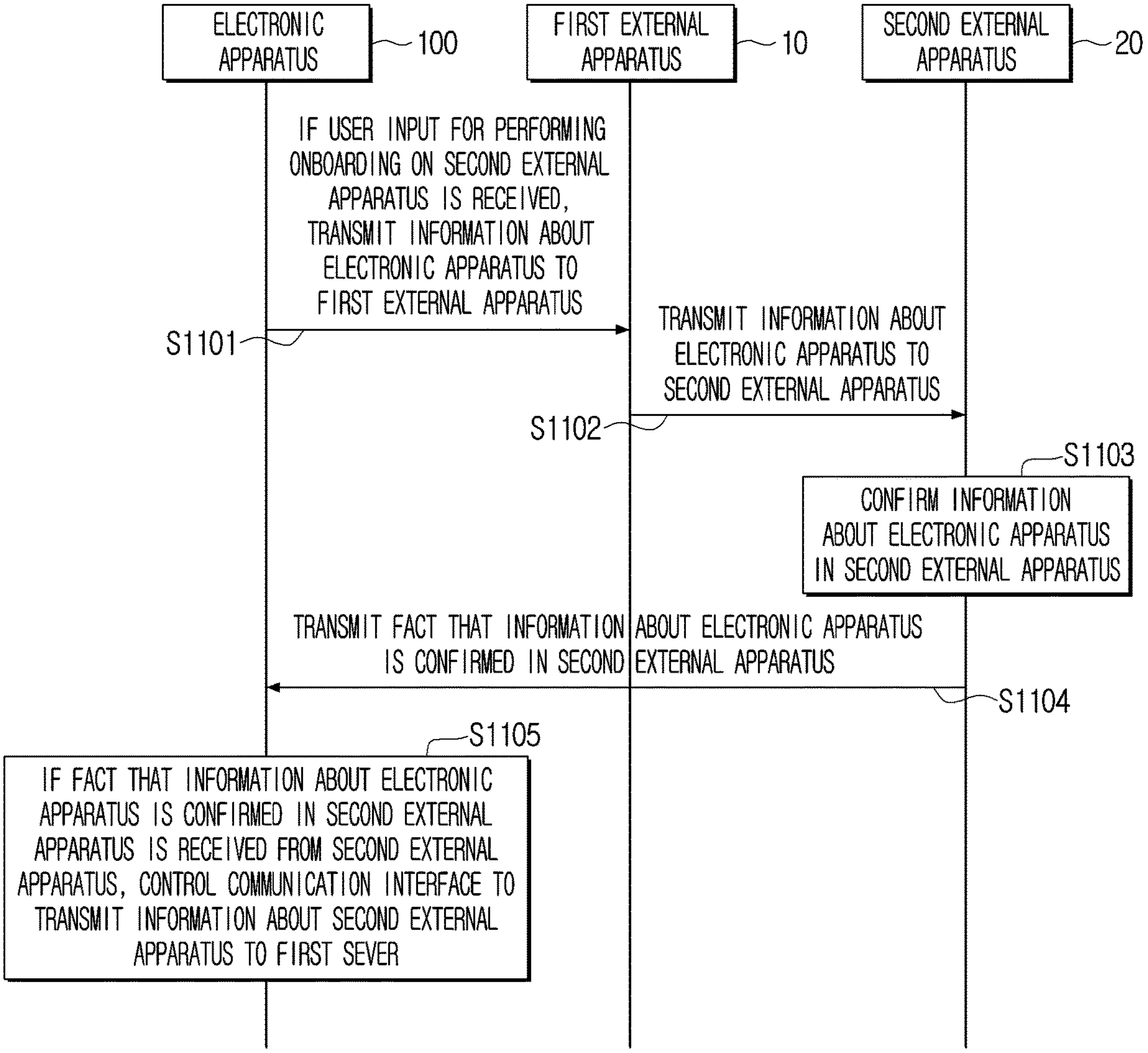

With reference to FIG. 11, the electronic apparatus 100, if a user input for performing onboarding on the second external apparatus 20 is received, may transmit information about the electronic apparatus to the first external apparatus 10 (S1101).

Further, the first external apparatus 10 may transmit information about the electronic apparatus to the second external apparatus 20 (S1102).

Still further, the second external apparatus 20, if receiving information about the electronic apparatus, may confirm the information about the electronic apparatus (S1103).

Then, the second external apparatus 20 may transmit information that the information about the electronic apparatus is confirmed in the second external apparatus 20 to the electronic apparatus 100 (S1104).

Further, the electronic apparatus 100, if receiving the information that the information about the electronic apparatus is confirmed in the second external apparatus 20, may control the communication interface to transmit the information about the second external apparatus to the first server (S1105).

Meanwhile, according to an embodiment of the disclosure, various embodiments described above may be implemented as software including instructions stored in a machine (e.g. computer) readable storage medium. The machine may refer, for example, to a device which calls instructions stored in the storage medium and is operable according to the called instructions, wherein the machine may include a device according to the disclosed embodiments. If the instructions are executed by a processor, the processor may perform a function corresponding to the instructions directly or by using other components under control of the processor. The instructions may include a code generated or executed by a compiler or an interpreter. The machine readable storage medium may be provided in a form of a non-transitory storage medium. Here, the term 'non-transitory storage medium' merely means that the storage medium is a tangible device and does not include a signal (e.g. an electromagnetic wave), wherein the term does not distinguish a case where data is stored semi-permanently in the storage medium from a case where data is stored temporarily in the storage medium. For example, the 'non-transitory storage medium' may include a buffer where data is temporarily stored.

According to an embodiment, a method according to various embodiments disclosed in the disclosure may be provided to be included in a computer program product. The computer program product may be traded between a seller and a buyer as goods. The computer program product may be distributed in a form of the machine-readable storage medium (e.g. compact disc read only memory (CD-ROM)) or on-line distributed (e.g. downloaded or uploaded) via an application store (e.g. Play Store™) or directly between two user devices (e.g. smart phones). In the case of the on-line distribution, at least part of the computer program product (e.g. a downloadable app) may be stored at least temporarily or may be generated temporarily in the machine-readable storage medium such as memory of a server of a manufacturer, a server of an application store, or a relay server.

As the above, preferable embodiments of the present disclosure are shown and described. However, it will be apparent that the disclosure is not limited to the aforementioned specific embodiments, and various modifications may be implemented by those skilled in the art without deviating from the gist of the disclosure claimed in the scope of claims, wherein these modifications should not be independently understood from the technical spirit or prospect of the disclosure. It will also be understood that any of the embodiment(s) described herein may be used in conjunction with any other embodiment(s) described herein.

What is claimed is:

1. An electronic apparatus comprising:
- a display;
- a communication interface including a communication circuit;
- memory; and
- at least one processor,
- wherein the at least one processor is configured individually or collectively to:
  - identify whether a first external apparatus is in an Out-Of-Box Experience (OOBE) state based on a signal received from the first external apparatus;
  - based on the first external apparatus being in the OOBE state and information about a second external apparatus connected to the first external apparatus being received by the first external apparatus, receive information about the first and second external apparatuses from the first external apparatus through the communication interface;
  - authenticate whether the electronic apparatus has authority to control or monitor the first external apparatus;
  - based on the authority of the electronic apparatus being authenticated, control the communication interface to transmit the information about the first external apparatus to a first server to perform onboarding on the first external apparatus;
  - identify whether the second external apparatus is present around the electronic apparatus based on a signal received from the second external apparatus; and
  - based on the second external apparatus being present around the electronic apparatus, display a UI inquiring about whether to perform onboarding on the second external apparatus on the display.

2. The electronic apparatus of claim 1, wherein at least one processor is configured individually or collectively to:
- based on an input for performing the onboarding on the second external apparatus being received, control the communication interface to transmit the information about the second external apparatus to the first server to perform the onboarding on the second external apparatus; and
- based on the input for performing the onboarding on the second external apparatus not being received, control the communication interface to transmit the information about the second external apparatus to a second server.

3. The electronic apparatus of claim 2, wherein at least one processor is configured individually or collectively to:
- based on the input for performing the onboarding on the second external apparatus being received, transmit information about the electronic apparatus to the first external apparatus; and
- based on information that the information about the electronic apparatus transmitted to the second external apparatus through the first external apparatus is confirmed in the second external apparatus being received from the second external apparatus, control the communication interface to transmit the information about the second external apparatus to the first server.

4. The electronic apparatus of claim 1, wherein at least one processor is configured individually or collectively to:
- based on the first external apparatus being not in the OOBE state, control the communication interface to transmit a control command for activating the first external apparatus to the first external apparatus; and
- based on a signal indicating that the first external apparatus is activated being received, not authenticate whether the electronic apparatus has authority to control or monitor the first external apparatus.

5. The electronic apparatus of claim 1, wherein at least one processor is configured individually or collectively to:
- identify whether the second external apparatus is in the OOBE state based on a signal received from the second external apparatus;
- based on the second external apparatus not being in the OOBE state, control the communication interface to transmit a control command for activating the second external apparatus through the first external apparatus to the second external apparatus; and
- based on a signal indicating that the second external apparatus is activated being received, identify whether the second external apparatus is present around the electronic apparatus.

6. The electronic apparatus of claim 1, wherein the information related to the first external apparatus includes a serial number and a MAC address of the first external apparatus, and
- wherein the information related to the second external apparatus includes a serial number and a MAC address of the second external apparatus.

7. The electronic apparatus of claim 1, wherein at least one processor is configured individually or collectively to:
- based on information about a third external apparatus being received from the first external apparatus through the communication interface, display a UI inquiring about whether to perform onboarding on the second and third external apparatuses at the same time on the display.

8. A method of controlling an electronic apparatus, the method comprising:

identifying whether a first external apparatus is in an OOBE state based on a signal received from the first external apparatus;

based on the first external apparatus being in the OOBE state and information about a second external apparatus connected to the first external apparatus being received by the first external apparatus, receiving information about the first and second external apparatuses from the first external apparatus through a communication interface;

authenticating whether the electronic apparatus has authority to control or monitor the first external apparatus;

based on the authority of the electronic apparatus being authenticated, controlling the communication interface to transmit the information about the first external apparatus to a first server to perform onboarding on the first external apparatus;

identifying whether the second external apparatus is present around the electronic apparatus based on a signal received from the second external apparatus; and based on the second external apparatus being present around the electronic apparatus, displaying a UI inquiring about whether to perform onboarding on the second external apparatus on a display.

9. The method of claim 8, comprising:

based on an input for performing the onboarding on the second external apparatus being received, controlling the communication interface to transmit the information about the second external apparatus to the first server to perform the onboarding on the second external apparatus; and based on the input for performing the onboarding on the second external apparatus not being received, controlling the communication interface to transmit the information about the second external apparatus to the second server.

10. The method of claim 9, wherein the controlling the communication interface to transmit the information about the second external apparatus to the first server further includes:

based on the input for performing the onboarding on the second external apparatus being received, transmitting information about the electronic apparatus to the first external apparatus; and based on information that the information about the electronic apparatus transmitted to the second external apparatus through the first external apparatus is confirmed in the second external apparatus being received from the second external apparatus, controlling the communication interface to transmit the information about the second external apparatus to the first server.

11. The method of claim 8, comprising:

based on the first external apparatus being not in the OOBE state, controlling the communication interface to transmit a control command for activating the first external apparatus to the first external apparatus; and based on a signal indicating that the first external apparatus is activated being received, not authenticating whether the electronic apparatus has authority to control or monitor the first external apparatus.

12. The method of claim 8, wherein the identifying whether the second external apparatus is present around the electronic apparatus includes:

identifying whether the second external apparatus is in an OOBE state based on a signal received from the second external apparatus;

based on the second external apparatus not being in the OOBE state, controlling the communication interface to transmit a control command for activating the second external apparatus to the second external apparatus through the first external apparatus; and based on a signal indicating that the second external apparatus is activated being received, identifying whether the second external apparatus is present around the electronic apparatus.

13. The method of claim 8, wherein the information related to the first external apparatus includes a serial number and a MAC address of the first external apparatus, and wherein the information related to the second external apparatus includes a serial number and a MAC address of the second external apparatus.

14. The method of claim 8, comprising:

based on information about a third external apparatus being received from the first external apparatus through the communication interface, displaying a UI inquiring about whether to perform onboarding on the second and third external apparatuses at the same time on the display.

15. A non-transitory computer readable recording medium storing computer instructions that, when executed by at least one processor of an electronic apparatus, cause the electronic apparatus to:

identify whether a first external apparatus is in an OOBE state based on a signal received from the first external apparatus;

based on the first external apparatus being in the OOBE state and information about a second external apparatus connected to the first external apparatus being received by the first external apparatus, receive information about the first and second external apparatuses from the first external apparatus through a communication interface;

authenticate whether the electronic apparatus has authority to control or monitor the first external apparatus;

based on the authority of the electronic apparatus being authenticated, control the communication interface to transmit the information about the first external apparatus to a first server to perform onboarding on the first external apparatus;

identify whether the second external apparatus is present around the electronic apparatus based on a signal received from the second external apparatus; and based on the second external apparatus being present around the electronic apparatus, display a UI inquiring about whether to perform onboarding on the second external apparatus on a display.

* * * * *